Jan. 26, 1960   J. H. VODRASKA ET AL   2,922,534
DRIVE-ON LIFT TRAILER
Filed June 13, 1958   4 Sheets-Sheet 1
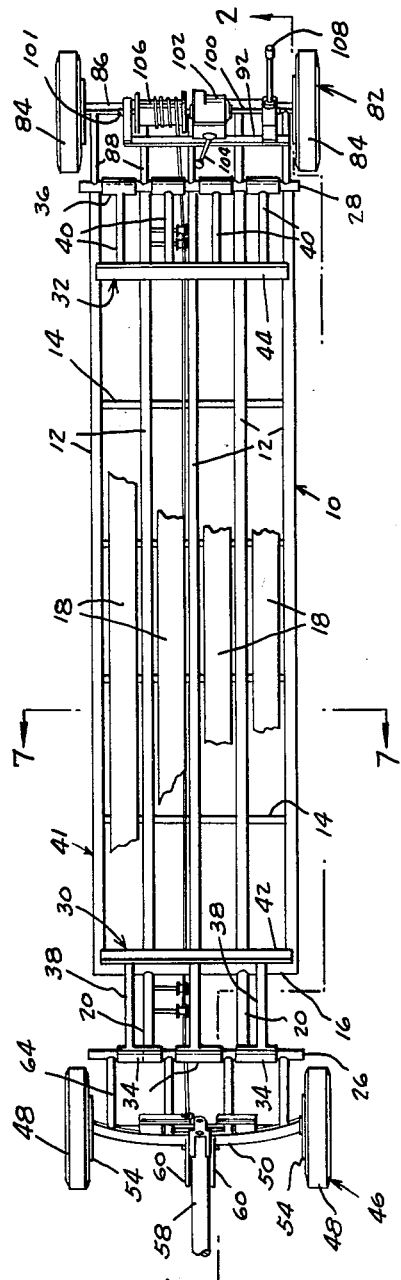
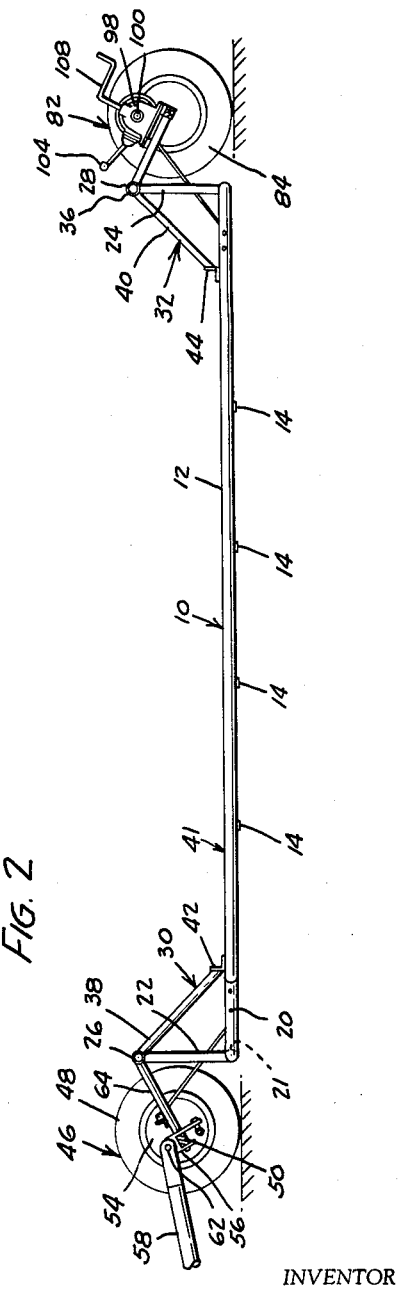
INVENTOR
JOSEPH H. VODRASKA
GERALD A. VODRASKA
BY
McMorrow, Berman + Davidson
ATTORNEYS Jan. 26, 1960

J. H. VODRASKA ET AL 2,922,534

DRIVE-ON LIFT TRAILER

Filed June 13, 1958

INVENTOR
JOSEPH H. VODRASKA
GERALD A. VODRASKA
BY
McMorrow, Berman + Davidson
ATTORNEYS Jan. 26, 1960

J. H. VODRASKA ET AL 2,922,534

DRIVE-ON LIFT TRAILER

Filed June 13, 1958

INVENTOR

JOSEPH H. VODRASKA
GERALD A. VODRASKA

BY McMorrow, Berman + Davidson

ATTORNEYS

Jan. 26, 1960     J. H. VODRASKA ET AL     2,922,534
DRIVE-ON LIFT TRAILER
Filed June 13, 1958     4 Sheets-Sheet 4
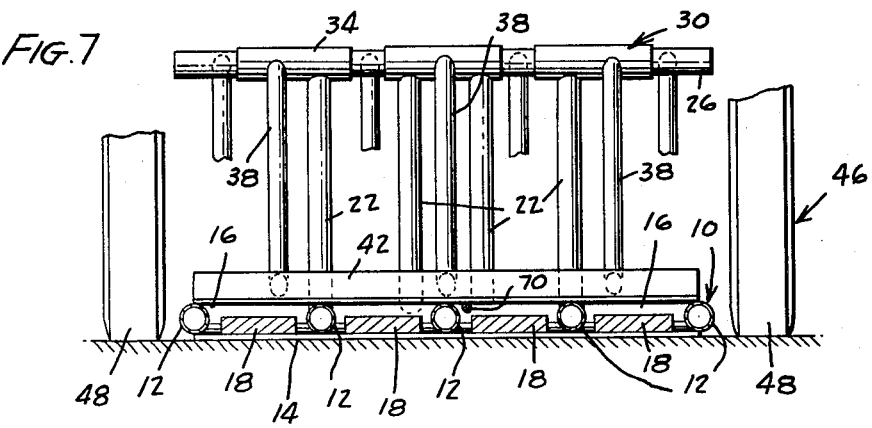
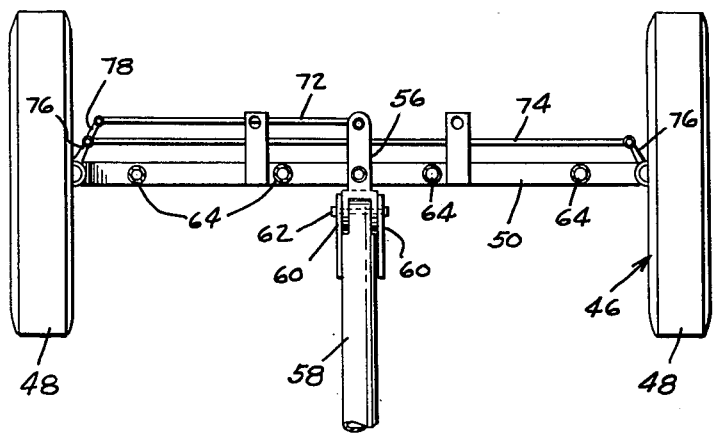
INVENTOR
JOSEPH H. VODRASKA
GERALD A. VODRASKA
BY
*McMorrow, Berman & Davidson*
ATTORNEYS

United States Patent Office 2,922,534
Patented Jan. 26, 1960

2,922,534

DRIVE-ON LIFT TRAILER

Joseph H. Vodraska, Wilson, Kans., and Gerald A. Vodraska, Portland, Oreg.

Application June 13, 1958, Serial No. 741,822

5 Claims. (Cl. 214—75)

This invention relates to trailers and other transport vehicles, designed for transporting large, relatively unwieldy structures, such as heavy farm implements. Among these would be rotary hoes, spring tooth harrows, grain drills, hay balers, etc.

The transport of implements of the character described is generally attended by considerable difficulty. This is due to the fact that such implements are ordinarily unwieldy, and apart from this, are heavy and difficult to load onto and off of a trailer. Lifting of an implement of the character described is very difficult, particularly when proper equipment is not available.

In view of the difficulties which have heretofore persisted, it is proposed in carrying out the present invention to provide a drive-on lift trailer which, during loading and unloading will include a support frame that will be disposed directly at ground level. Accordingly, the implement can be driven onto or off of said frame without difficulty. The device, after the implement is so loaded, is designed for vertical adjustment of the frame, so that the supported implement will be at a substantial distance above the ground, sufficient to provide necessary road clearance during the subsequent movement of the trailer to the location at which the implement is to be unloaded.

Heretofore, it has been proposed, broadly, to provide drive-on lift trailers. In accordance with the present invention, an improved structure in such a trailer is provided, having novel means for lifting and lowering the support frame.

Further in accordance with the present invention, the frame lifting means has a mechanical linkage, that is, a relative formation and arrangement of the component parts of the lifting means, designed to produce lifting of the trailer frame with substantial ease, that is, with a relatively low expenditure of power, considering the benefits to be obtained from the use of the device.

Still another object is to provide a device of the character stated which will be rugged, compact, fully efficient in discharging its intended purposes, and yet adapted for manufacture at a comparatively low cost.

Other objects will appear from the following description, the claims appended thereto, and from the annexed drawing, in which like reference characters designate like parts throughout the several views, and wherein:

Figure 1 is a top plan view, portions being broken away, of a trailer according to the present invention;

Figure 2 is a longitudinal sectional view substantially on line 2—2 of Figure 1;

Figure 7 is a transverse sectional view, on substantially the same scale as Figure 4, taken approximately on line 7—7 of Figure 4; and Figure 8 is a top plan view of the leading wheel assembly, on the same scale as Figure 7, when said wheel assembly is in its dotted line position of Figure 4 with the frame raised.

Figure 3:
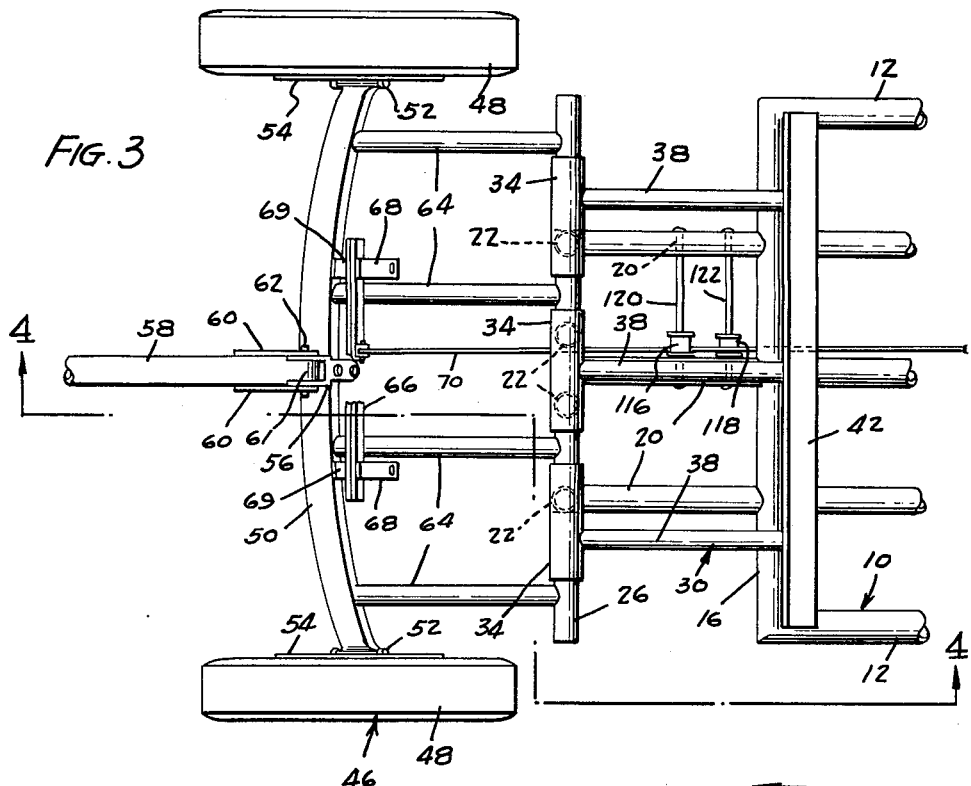
Figure 3 is an enlarged top plan view of the leading portion of the trailer.

Referring to the drawing in detail, designated generally at 10 is an elongated, wide frame formed entirely of stout pipe material. The frame 10 is of rectangular configuration, being elongated in a fore and aft direction, and comprises a plurality of parallel, straight, elongated, longitudinal frame members 12, between which are connected cross members 14 of selected locations longitudinally of the frame. The cross members 14 are extended parallel to a front cross member 16 of pipe material, welded to and connected between the leading ends of the several longitudinal members 12. A plurality of planks 18 are provided, alternating with the members 12 in the spaces between said members 12, said planks being supported upon the several intermediate cross members 14 and being riveted or otherwise fixedly secured to said cross members.

At the front end of the frame a plurality of relatively short brace members 20 are provided. These are rigid with and extend forwardly from the front cross member 16, at uniformly spaced locations transversely of the frame. At their front ends the members 20 are fixedly secured to a cross member 21, and rigid with and extending upwardly from the cross member 21 are arms 22. In the illustrated example, as seen from Figure 3, four arms 22 are provided, extending upwardly at right angles to the plane of the frame 10.

Figure 5:
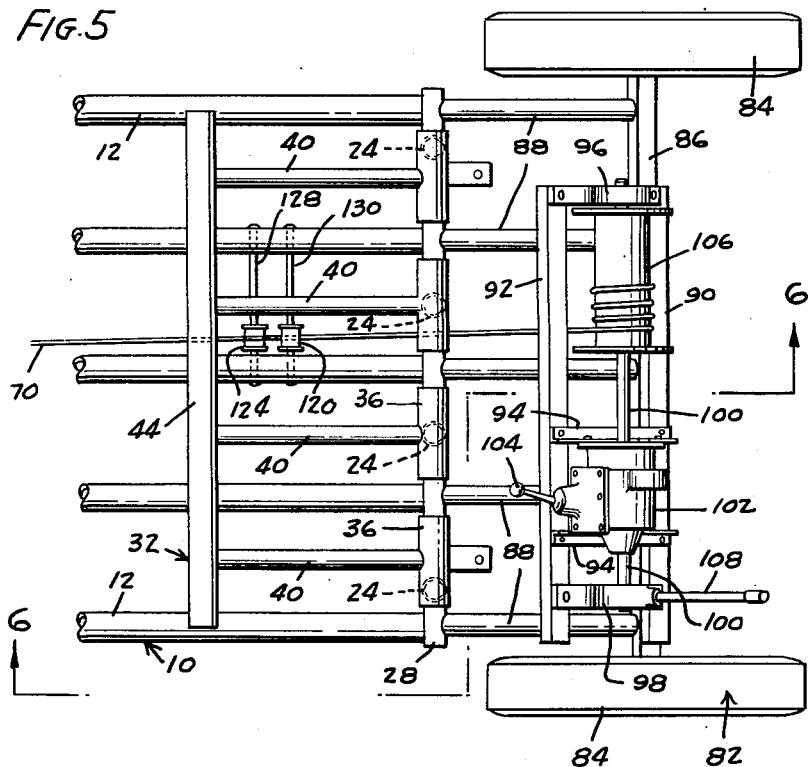
Figure 5 is a top plan view, on the same scale as Figure 3, of the rear end portion of the trailer.
Figure 6:
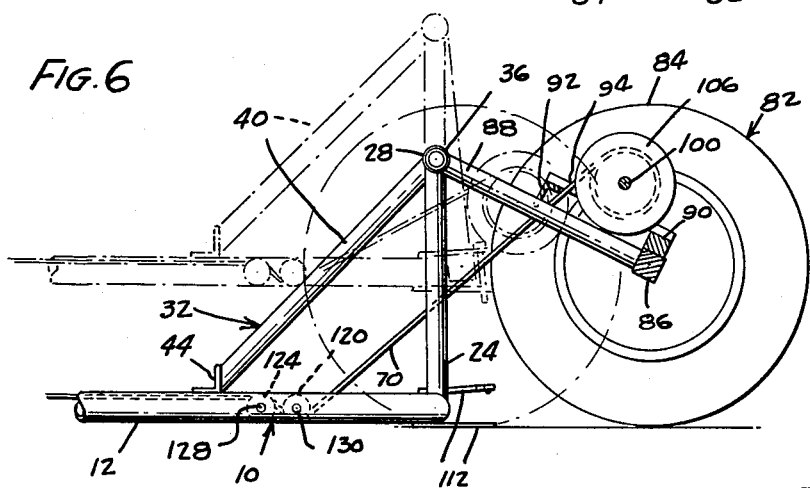
Figure 6 is a sectional view, on the same scale as Figure 5, taken substantially on line 6—6 of Figure 5, the frame being shown in full and dotted lines in lowered and elevated positions respectively.

Referring now to Figures 5 and 6, at the rear end of the frame, a plurality of uprights 24 are provided, there being four of these as shown in Figure 5 in the illustrated example of the invention. These are rigid with and extend upwardly from the rear cross member of the frame.

Horizontally disposed, transversely extending, front and rear members 26, 28 respectively are secured to the upright members 22, 24 respectively, and comprise portions of generally triangular end frames 30, 32 rigid with the main frame 10 and formed wholly of pipe stock. The end frames are of right angular form, as will be noted from Figure 2, when viewed in side elevation, with the bottom, horizontal legs of said end frames being disposed in coplanar relation to the main frame 10, said end frames further including the vertical uprights 22, 24, and the inclined brace members 38, 40 of the end frames 30, 32. The main frame 10 and the end frames 30, 32 together constitute a rigid frame structure generally designated 41.

A plurality of coaxially aligned, transversely spaced sleeves 34 are provided at the head end of the frame 10, and a similar series of sleeves 36 is provided at the rear end of the frame. The sleeves 34 receive a rotatable pipe 26, while the sleeves 36 receive a rotatable pipe 28. Uprights 22, 24 at their upper ends are secured to the sleeves 34, 36 respectively, rather than to the pipes 26, 28 since as will presently appear, the end frames remain wholly rigid, though the pipes 26, 28 rotate in the upper ends of the end frames during elevation and lowering of the main frame 10.

At their lower, inner ends the brace arms 38, 40 are fixedly secured to angle iron cross braces 42, 44 welded to or otherwise fixedly attached to the ends of the main frame.

Figure 4:
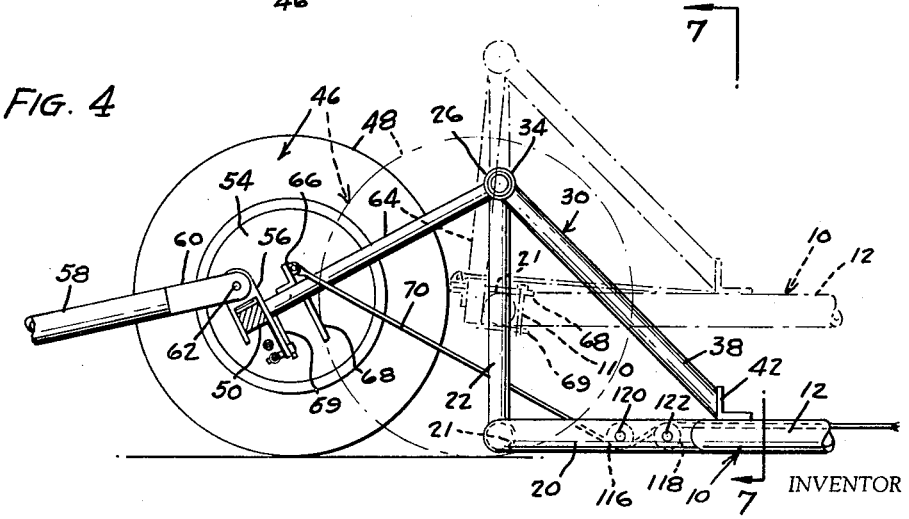
Figure 4 is a sectional view, on the same scale as Figure 3, taken substantially on line 4—4 of Figure 3, the frame being shown in lowered and elevated positions in full and dotted lines respectively.

A front wheel assembly generally designated at 46 includes ground wheels 48, between which extends a forwardly bowed axle 50 (see Figures 3 and 4). King pins 52 extend through sleeves provided in the ends of the axle, and connected to the king pins are wheel hubs 54 on which the wheels are mounted.

A yoke 56 is fixedly secured to the axle 50 and projecting forwardly from the yoke is a drawbar 58, the rear end of which is rigid with side plates 60 disposed in embracing relation to the arms of the yoke 56, with the drawbar having a tongue 61 extending between the yoke arms and apertured to receive a connecting pin 62. The drawbar thus is adapted to swing upwardly and downwardly upon the yoke.

Rigid with and projecting forwardly from the pipe 26 are connecting arms 64 (see Figure 3) the forward ends of which are connected fixedly to the axle 50. Thus, arms 64 when swinging between the full and dotted line positions of Figure 4, extend radially from and travel about an axis defined by the pipe 26, so that the main frame 10 is raised or lowered according to the direction in which the arms swing.

For the purpose of swinging the arms 64 rearwardly from their full to their dotted line positions of Figure 4, there is provided a transversely extending, angle iron connecting bracket 66 secured fixedly to the two intermediate arms 64. Tongues 68 are secured fixedly to the brackets 66, and are adapted to extend in overlying relation to the front cross member 21 when the arms 64 are swung rearwardly to the Figure 4 position. In addition, there are tongues 69, which are spaced downwardly from and extend parallel to the tongues 68, these being secured to the top surface of the axle 50 so as to extend under the cross member 21 in the raised dotted line position of the frame 10 shown in Figure 4.

To swing the arms 64 to their dotted line positions of Figure 4, there is provided a cable 70 pivotally connected at its forward end to the bracket 66. The operational characteristics of the cable will be described hereinafter in greater detail.

Steering means is provided for the front wheels, and is shown in Figure 8. Said steering means operates only when the main frame is lifted, since it is only in these circumstances that the trailer would be moving and would have to be steered. The steering means includes a steering rod 72, and a tie rod 74, the tie rod 74 being connected to steering knuckle arms 76 carried by the king pins. One of the arms 76 has an extension 78 connected to the steering rod 72, so that on lateral swinging movement of the tongue or drawbar 58, the wheels will be steered to right or left, according to the direction in which the drawbar is swung.

Cable 70 extends longitudinally and centrally of the frame, extending to the rear wheel assembly which has been generally designated at 82. The rear wheel assembly 82 includes rear ground wheels 84. These are not of the steerable type, in a usual commercial embodiment, but they are rotatable upon a rear axle 86. Axle 86 is rigidly connected to the rear ends of connecting bars 88, which are spaced transversely of the rear wheel assembly and which are fixedly connected, at their forward ends, to the rear cross member 28. This is shown to best advantage in Figures 5 and 6.

Thus, the rear axle is adapted to swing with the arms 88 about the axis defined by the pipe 28, between the full and dotted line positions shown in Figure 6.

Extending in longitudinally contacting relation to and fixedly secured to the axle 86 is a support bar 90 and spaced forwardly from the bar 90 in parallel relation thereto is a front support bar 92. Connecting bars 94 are extended between the bars 90, 92 and cooperate therewith in providing a generally rectangular support frame carried by the rear axle and swingable with the rear axle.

Bearings 96, 98 are mounted upon the support frame and journaled therein are drive and driven shafts 100, 101.

The shafts extend into a gear box 102 having a shift lever 104. A winch 106 is rotated by shaft 101.

To rotate the drive shaft 100 there is provided a crank 108 which would have a gear type driving connection with the shaft 100. Instead of a manual shaft rotating means such as shown in the several figures of the drawing, there could be provided a motor.

In use of the device, it will be understood that the winch drum will be rotated at a selected speed, according to the location to which the lever 104 is shifted. In actuality, the transmission 102 comprises the transmission of an automobile in a typical embodiment, so that when one turns the crank 108, the shaft 100 is rotated at a selected rate of speed in relation to the power expended or the number of turns given the crank 108. In any event, the drum is rotated, winding the cable thereon. This causes the front and rear axles to swing toward the opposite ends of the frame 10, to the dotted line positions shown in Figures 4 and 6 respectively. Therefore, the main frame is raised. Of course, first the implement would be driven onto the lowered frame, the frame when lowered being disposed in full contact with the ground. When the frame is raised, sufficient ground clearance is provided, so that the implement can be transported to any desired location.

The construction further permits the frame to be locked in its raised position, merely by locking the crank 108 against rotation. Any suitable lock means can, of course, be provided, and instead of locking the crank 108 against rotation, the tongues 68, 69 disposed in embracing relation to the front cross member 21, will hold the arms 64 against swinging movement away from the cross member 21, due to the provision of a pin 110 extended between the tongues 68, 69 (see Figure 4). The pin is removed whenever the frame is to be lowered. Similarly, at the rear end of the main frame there are tongues 112 fixedly secured to the rear end of the frame and adapted to embrace the rear axle 86, receiving a pin 114 in the raised position of the main frame.

To keep the cable 70 taut, there is provided, at the front end of the structure, a pair of spools 116, 118, mounted on rods 120, 122 respectively. At the other end there are spools 124, 126 rotatable on rods 128, 130. The rods are mounted on the end frames 30, 32. The cable is trained over the inner spools 118, 124 and under the outer spools 116, 126.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A drive-on trailer for heavy implements and like objects comprising a main, load-supporting frame; end frames rigid with the main frame at opposite ends of the main frame; front and rear wheel assemblies pivoted to the upper ends of the respective end frames for swinging movement between first positions in which the main frame is lowered into contact with the ground surface and second positions in which the main frame is elevated above the ground surface; and means connecting the respective wheel assemblies for conjoint movement to and from said positions, said main frame being of elongated, planiform formation, the end frames being disposed wholly in and above the plane of the main frame, and being of right-triangular formation in side elevation with the pivot axes of the wheel assemblies being disposed at the apices of the respective end frames.

2. A drive-on trailer for heavy implements and like objects comprising a main, load-supporting frame; end frames rigid with the main frame at opposite ends of the main frame; front and rear wheel assemblies pivoted to the upper ends of the respective end frames for swinging movement between first positions in which the main frame is lowered into contact with the ground surface and second positions in which the main frame is elevated above the ground surface; and means connecting the respective wheel assemblies for conjoint movement to and from said positions, said main frame being of elongated, planiform formation, the end frames being disposed wholly in and above the plane of the main frame, and being of right-triangular formation in side elevation with the pivot axes of the wheel assemblies being disposed at the apices of the respective end frames, the respective wheel assemblies including support arms projecting radially outwardly from the pivot axes and further including axles connected to the ends of said arms remote from the pivot axes, for swinging of the axles in arcuate paths about said pivot axes.

3. A drive-on trailer for heavy implements and like objects comprising a load supporting main frame formed as an elongated, wholly planiform, generally rectangular structure; end frames rigid with the opposite extremities of the main frame and having upstanding portions projecting upwardly from the plane of the main frame; wheel assemblies carried by the end frames, the wheel assemblies including arms having pivotal connections to the upper ends of the end frames, said arms extending radially from said pivotal connections and being swingable thereabout toward and away from the end frames, said assemblies further including axles secured to the ends of the arms remote from the pivot axes and ground wheels carried by the axles, said arms when swung toward the end frames moving the wheels to positions elevating the main frame, the arms when swung away from the end frames swinging the wheels to positions in which the main frame is lowered into contact with the ground surface; and means connected directly between the wheel assemblies adapted for imparting conjoint movement to said arms toward and away from the end frames.

4. A drive-on trailer for heavy implements and like objects comprising a load supporting main frame formed as an elongated, wholly planiform, generally rectangular structure; end frames rigid with the opposite extremities of the main frame and having upstanding portions projecting upwardly from the plane of the main frame; wheel assemblies carried by the end frames, the wheel assemblies including arms having pivotal connections to the upper ends of the end frames, said arms extending radially from said pivotal connections and being swingable thereabout toward and away from the end frames, said assemblies further including axles secured to the ends of the arms remote from the pivot axes and ground wheels carried by the axles, said arms when swung toward the end frames moving the wheels to positions elevating the main frame, the arms when swung away from the end frames swinging the wheels to positions in which the main frame is lowered into contact with the ground surface, said arms and axles being disposed wholly beyond the respective, adjacent ends of the main frame in both the elevated and lowered positions of the main frame with the arms declining in a direction away from their pivot axes in both of said positions; and means connected directly between the wheel assemblies adapted for imparting conjoint movement to said arms toward and away from the end frames, and including a flexible element extending between the wheel assemblies under said pivot axes and constituting a connection between the arms, said element being disposed no higher than the plane of the main frame over the full length of the main frame, the front wheel assembly including means to steer the same in the elevated position of the main frame.

5. A drive-on trailer for heavy implements, comprising: a frame structure including an elongated, wide main frame having a flat, load-supporting top surface, said structure further including end frames rigidly connected to the main frame at the opposite ends of the main frame, each end frame projecting above the plane of said surface to form a load-restraining abutment at the associated end of the main frame; front and rear ground wheel assemblies pivotally attached to the respective, opposite ends of said structure, each assembly including axle means, ground wheels on the axle means, and arm means connected at one end to the axle means and pivotally attached at the other end to the upper end of the adjacent end frame for swinging movement between first positions in which the main frame is lowered into contact with the ground for loading and unloading of heavy implements, and second positions in which said main frame is elevated for transport of the supported load, said arm means and axle means of the respective assemblies being disposed, in both of said positions of the arm means, wholly beyond the extremities and sides of said surface; and means connected directly between the wheel assemblies linking the arm means for conjoint movement between said positions thereof, said last-named means including a flexible element disposed below the top surface of the main frame over the full length of said surface and extending within the respective end frames below the pivot axes of the arm means in positions protected by said abutments from engagement by the supported load.

References Cited in the file of this patent

UNITED STATES PATENTS

| | | |
|---|---|---|
| 2,230,014 | Raven | Jan. 28, 1941 |
| 2,545,119 | Stratton et al. | Mar. 13, 1951 |
| 2,595,289 | Peterson | May 6, 1952 |
| 2,745,674 | Struble | May 15, 1956 |